(12) United States Patent
Kennedy

(10) Patent No.: US 11,991,961 B2
(45) Date of Patent: May 28, 2024

(54) SOLAR POWER GENERATION AND AGRICULTURAL MATERIAL DISPERSAL SYSTEM

(71) Applicant: The Phoebus Fund, LLC, Williamstown, NJ (US)

(72) Inventor: Andrew Ryan Kennedy, Haddonfield, NJ (US)

(73) Assignee: THE PHOEBUS FUND, LLC, Williamstown, NJ (US)

( * ) Notice: Subject to any disclaimer, the term of this patent is extended or adjusted under 35 U.S.C. 154(b) by 360 days.

(21) Appl. No.: 17/404,111

(22) Filed: Aug. 17, 2021

(65) Prior Publication Data

US 2022/0053713 A1 Feb. 24, 2022

Related U.S. Application Data

(60) Provisional application No. 63/066,981, filed on Aug. 18, 2020.

(51) Int. Cl.
*A01G 25/02* (2006.01)
*H02S 30/10* (2014.01)
*H02S 40/32* (2014.01)

(52) U.S. Cl.
CPC .............. *A01G 25/02* (2013.01); *H02S 30/10* (2014.12); *H02S 40/32* (2014.12)

(58) Field of Classification Search
CPC ........ A01G 9/243; A01G 9/249; A01G 9/247; A01G 13/0206; A01G 7/00; A01G 25/02; H02S 40/425; F21V 23/0464
See application file for complete search history.

(56) References Cited

U.S. PATENT DOCUMENTS

| 7,592,537 | B1 | 9/2009 | West | |
| 8,429,861 | B2 * | 4/2013 | Conger | H02S 20/32 52/146 |
| 8,453,659 | B2 * | 6/2013 | Li | A45B 25/00 361/679.02 |
| 8,468,741 | B2 * | 6/2013 | Lewis | A01G 9/1423 47/17 |

(Continued)

FOREIGN PATENT DOCUMENTS

| WO | 2011/047828 A1 | 4/2011 | | |
| WO | WO-2011047828 A1 * | 4/2011 | ............. | A01G 9/243 |

(Continued)

*Primary Examiner* — Monica L Perry
*Assistant Examiner* — Aaron M Rodziwicz

(57) ABSTRACT

Combined solar power generation and agricultural material dispersion system having at least one system module comprising a solar power generation panel having a solar energy collection surface disposed opposite a base surface; a barrier panel; at least two coupling elements extending between and coupled to the base surface of the solar power generation panel and a first surface of the barrier panel for forming a cavity between the solar power generation panel and the barrier panel to enable at least one electrical cable to be disposed therein; and at least one liquid conduit coupled to a second surface of barrier panel. The at least one liquid conduit for conveying agricultural dispersion material. The barrier panel providing a waterproof barrier between the conduit and electrical cables disposed within the cavity.

21 Claims, 5 Drawing Sheets

(56) References Cited

U.S. PATENT DOCUMENTS

| | | | |
|---|---|---|---|
| 8,517,289 B2 | 8/2013 | Parod et al. | |
| 9,252,311 B2* | 2/2016 | Wolter | H01L 31/05 |
| 10,130,047 B2* | 11/2018 | Surany | F24S 25/10 |
| 10,624,275 B1* | 4/2020 | Lewis | A01G 9/247 |
| 11,337,379 B2* | 5/2022 | James | A01G 9/26 |
| 2005/0091916 A1* | 5/2005 | Faris | A01G 25/00 47/79 |
| 2005/0105970 A1* | 5/2005 | Faris | E03B 3/03 405/41 |
| 2005/0216129 A1 | 9/2005 | Clark et al. | |
| 2008/0148631 A1* | 6/2008 | Wan | A01G 13/0206 47/20.1 |
| 2013/0087640 A1 | 4/2013 | Pfrenger | |
| 2014/0028242 A1* | 1/2014 | Akin | H01L 31/042 320/101 |
| 2014/0261596 A1* | 9/2014 | Nallakrishnan | A01G 13/0212 135/96 |
| 2016/0365826 A1 | 12/2016 | DeBartolo, III et al. | |
| 2017/0126172 A1* | 5/2017 | Nogier | F24S 50/40 |
| 2018/0325044 A1* | 11/2018 | Tilley | A01G 9/12 |
| 2020/0253133 A1* | 8/2020 | Lewis | A01G 9/249 |
| 2020/0323193 A1* | 10/2020 | King | A01M 29/10 |
| 2022/0217920 A1* | 7/2022 | Venusio Tamburrino | H02S 40/10 |

FOREIGN PATENT DOCUMENTS

| | | |
|---|---|---|
| WO | 2016174576 A1 | 11/2016 |
| WO | 2021205114 A1 | 10/2021 |

* cited by examiner

SOLAR POWER GENERATION AND AGRICULTURAL MATERIAL DISPERSAL SYSTEM

CROSS-REFERENCE TO RELATED APPLICATION

This application is based on and claims priority to U.S. Provisional Patent Application Ser. No. 63/066,981 filed Aug. 18, 2020, the disclosures of which are hereby incorporated in their entirety by reference herein.

FIELD OF THE INVENTION

The instant invention generally relates to systems useable on farmland for both agricultural production and energy generation.

BACKGROUND OF THE INVENTION

Energy obtained from renewable energy sources is increasing globally. The tremendous growth in the solar industry is helping obtain a cleaner, more sustainable energy future. However, solar energy sources only produced about 3% of the electricity generation in 2019 according to the U.S. Energy Information Administration. It is estimated that solar panels on just 0.6% of the total land area of the United States could supply enough electricity to power the entire United States as per the National Renewable Energy Laboratory and U.S. Department of Energy. SunShot Vision Study. February 2012. The present invention provides systems and methods, which will enable the further expansion of solar energy.

SUMMARY OF THE INVENTION

Provided is a solar power generation and agricultural material dispersion system having at least one system module which comprises: a solar power generation panel having a solar energy collection surface disposed opposite a base surface, and at least four edges, the at least four edges including first and second edges disposed substantially parallel to one another; a barrier panel having a first surface disposed opposite to a second surface; at least two coupling elements extending between and coupled to the base surface of the solar power generation panel and the first surface of the barrier panel, said coupling elements specifically configured to form a cavity between the solar power generation panel and the barrier panel extending in a direction between said first and second edges of the solar power generation panel to enable an at least one electrical cable to be disposed within said cavity; and at least one liquid conduit coupled to the second surface of barrier panel and extending in a direction between said first and second edges of the solar power generation panel, the at least one liquid conduit specifically adapted for conveying agricultural dispersion material, wherein said barrier panel provides a waterproof barrier between the at least one liquid conduit and any electrical cables disposed within said cavity.

BRIEF DESCRIPTION OF THE DRAWINGS

The drawings described below are for illustrative purposes only and are not intended to limit the scope of the invention.

DETAILED DESCRIPTION OF THE INVENTION

Figure 1:
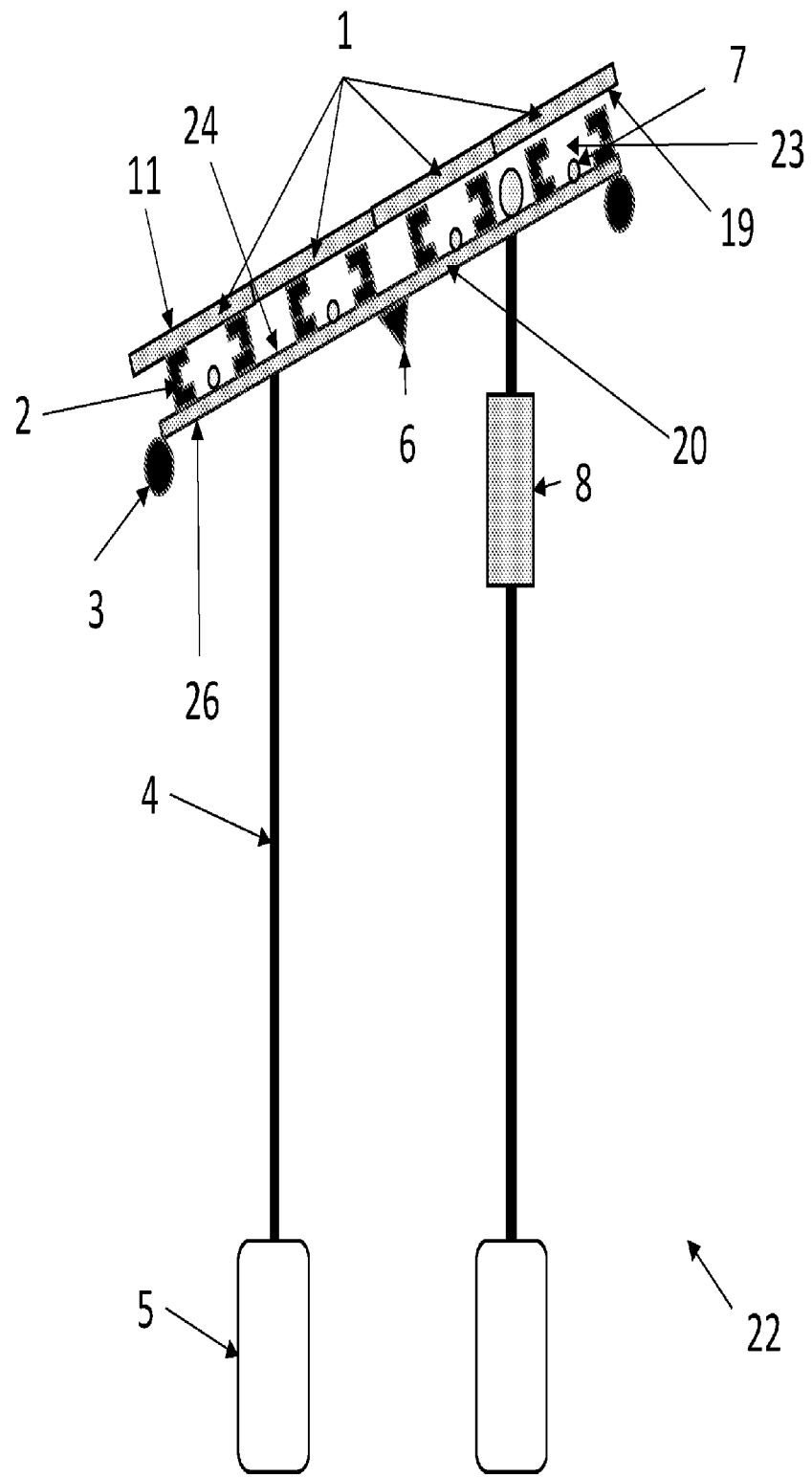
FIG. 1 depicts a cross sectional view of an exemplary solar power generation and agricultural material dispersion system in accordance with this disclosure.

It is to be understood that the terminology employed herein is for the purpose of describing particular embodiments, and is not intended to be limiting. Further, although any methods, devices and materials similar or equivalent to those described herein can be used in the practice or testing of the invention, certain methods, devices and materials are now described.

Throughout this application, articles "a" and "an" are used in this disclosure to refer to one or more than one (i.e., to at least one) of the grammatical object of the article.

The disclosure is further illustrated by the following description, which are not to be construed as limiting this disclosure in scope or spirit to the specific procedures herein described. It is to be understood that the descriptions are provided to illustrate certain embodiments and that no limitation to the scope of the disclosure is intended thereby. It is to be further understood that resort may be had to various other embodiments, modifications, and equivalents thereof which may suggest themselves to those skilled in the art without departing from the spirit of the present disclosure and/or scope of the appended claims.

The present invention includes an elevated modular structure having a combined agricultural material dispersal system and solar power generating equipment, wherein the electrical components sensitive to water are disposed above a liquid conduit of the agricultural material dispersal system, which are further separated by a waterproof barrier. The system, while described herein with regard to solar power generation panels, is readily adaptable for use with components of a combined wind energy generation and agricultural material dispersion systems.

The disclosed solar power generation and agricultural material dispersion system employs an advantageous modular configuration of combining solar power generation and its electrical cabling with the conveyance of liquid agricultural dispersion material, e.g., water, in a safe manner. Such configuration is relatively compact and suitable for rapid deployment on farmland with the further advantages of requiring less land dedicated to such system that would be unusable for crops than traditional solar power generation systems. Thus, the system disclosed herein enables solar power generation on farmland while limiting the impact on crop production or other uses, while also providing agricultural dispersion material for liquid-based material including, but not limited to, irrigation material, e.g., water, pesticides, herbicides, and fertilizing material.

The system's modular configuration further possesses a structure that enables the grouping of respective system modules, each employing one or more solar power generation panels, in a given farm implementation for individual ownership and monitoring by third parties not related to the farmers. This allows multiple owners and utility companies to monitor and control grouped modules and their panels, which can be aggregated with other off-site meters and control systems.

Current solar panel ground mount systems do not allow for the ground below them to be used efficiently for agricultural production. Presently, in most instances, farmers must choose to use sections of land for agriculture production or for solar production, but not both. If agricultural production was attempted in connection with current solar panel ground systems, it would likely result in significant degradation of the ability of the land to support agricultural uses. Additionally, due to the electrical nature of the solar panel equipment, irrigation may cause problems and risks if used with current solar panel ground mount systems. If irrigation is not used, a dramatic reduction in the productivity of the land will often result. Overall, the present invention addresses a major problem with conventional solar power generation systems, which take viable arable land out of agriculture production.

Current solar panel ground mount systems either only elevate solar panels for use as a carport or canopy system or, alternatively, only provide power generation for dispersal systems, e.g., electrically-powered pumps, for farmland use. The functional combination of the systems of the present invention enable the ability to provide solar generating equipment on farmland and also increase the viability of farmland by providing an agricultural material distribution system. The system provides a significant improvement compared to traditional solar ground mounted systems or traditional agricultural material dispersal systems.

Traditional community-owned solar power generation systems utilize a proportional undivided interests basis of the energy production of a plurality panels based on the amount of solar required for the customer within such community. Thus, the customer does not own specific panels, inverters, or meters and cannot specifically attribute any individual section of the solar field to their ownership. In contrast, the configuration of the present system enables individually meters and inverters to connect to individual or groups of system modules for third-party ownership of the panel systems and the aboveground space in which the panels reside within a single farm deployment of such systems. Such segmentation of system module ownership also enables electrical power generated to be sold at an economically advantageous rate by such owners. This individual ownership is advantageous because typically solar panels on a given farm may generate significantly more power than such farm can use on a particular day or time of day, thus creating an economic incentive to utilize the power in an offsite third party ownership configuration for sale or credit to the accessible utility power grid.

The presently disclosed systems have many advantages over traditional systems. The configuration of the systems results in a minimal reduction in agriculturally productive farmland, and the agricultural material dispersal components may advantageously increase the arability of the land. For the agriculture landowner, such system increases the economic production of the land by adding solar energy production.

For example, a first five-acre farm may use 2.5 acres for 100% agricultural production and the remaining 2.5 acres for 100% solar production using a traditional solar panel installation for the production of approximately 1.0 MW of electricity using conventional solar panel technology over a certain period of time. Thus, such first farm agricultural production would be 50% of a five-acre farm where the entire five acres are used exclusively for agricultural production. Advantageously, a second five-acre farm may use the disclosed solar power generation and agricultural material dispersion system to generate approximately 0.5 MW of electricity using conventional solar panel technology over the same time period and approximately 80% of the agricultural production relative to the five acre farm where the entire five acres are used for agricultural production, thereby increasing the agricultural production of such farmland relative to the first five-acre farm. Moreover, because of the advantageous small reduction on agricultural production that the disclosed system provides, it would be attractive to more farms to install such systems resulting in greater use and greater aggregate electricity generation.

The system also provides some shade on the land, which allows for a reduction of the amount of water required to irrigate. The system may also produce microclimate conditions such that a wider variety of agricultural products may be produced. The system may also be used to convert non-arable land into arable land by producing microclimate conditions. Some of the other benefits of such system include:

- providing a reduced impact on the land due to the elevated nature of the equipment;
- providing a reduced impact on agricultural best practices due to its elevated and spanned nature;
- providing the ability to segment between net metered power and grid connected power sales;
- providing the ability to segment the system modules in a farmland deployment into portions of real property, allowing physical ownership of groups of system modules and associated air rights to the third party owner;
- providing an additional value-generating asset for agricultural land owners in the air rights of their fields, and
- providing a pride of ownership for third-party owners, which want the ability to own a specific solar field as opposed to a proportional ownership of a field.

To date, there is no combination of large-scale solar generating assets with large-scale agricultural material dispersal systems to provide an increased agricultural production on farmland. The systems disclosed herein may be implemented as lightweight modular structures, which support solar power generating panel in a system adapted for use in association with agricultural production.

Additionally, to date, there is no current system that allows individual ownership of panels or groups of panels and associated monitoring and control equipment, but rather traditional systems only allow for proportional undivided ownership. Individually metering sections or groups of the disclosed system modules in a given farm deployment provides an advantageous ownership structure enabling the ownership of solar generating systems for third-party owners and a segmentation of behind-the-meter net metered generation, grid connected mercantile systems, meter aggregation systems, virtual net metering system, virtual metering systems, or remote net metering systems.

The combined renewable energy generating system and irrigation/agricultural material dispersal system of the disclosed system would not be an obvious combination because large volumes of conveyed liquids and electric generating equipment do not typically work well together due to safety and high potential for damage of electrical components. The disclosed system incorporates a configuration that mitigates the risks and concerns that traditionally has prevented the combination of these two disparate elements into a single system. In the modules of such combined system, the solar generating equipment (panels and associated electrical cables) are located above and separated from the irrigation/agricultural material dispersal system by a waterproof barrier, which in addition to the effects of gravity, prevents water/material directly contacting those electrical connections and components that would be adversely effected if wet. However, certain components typically manufactured for outdoor applications and wet conditions, e.g., electrical combiner boxes and inverters, may be located below the irrigation system due to environmental protection characteristics.

In the disclosed system, components the agricultural material dispersal system is located below the solar panels to advantageously provide dispersal of the agricultural product to the farmland without any blockage or hindrance by the solar panels or their associated electrical components. This allows for a uniform dispersal of materials (e.g. liquids) across the agriculture field. This uniform dispersal ensures that the proper levels of agricultural material are used and the agricultural produce is not damaged due to an over/under supply of such materials.

The solar panels are placed above the irrigation/agricultural material dispersal system to protect the underlying equipment from direct elements thereby minimizing wear and tear. This allows the irrigation system to have a longer useful life, likely for the full life of the solar equipment. Due to this advantageous design, individual issues that may arise with the panels or the irrigation system may be addressed individually without affecting the other systems.

FIG. 1 depicts a cross-sectional view of an exemplary solar power generation and agricultural material dispersion system module 22, which includes solar power generation panel 1 having a solar energy collection surface 11 and base surface 19. The solar power generation panel 1 is mechanically, directly or indirectly, attached to and supported by a coupling element such as purlin 2 via the base surface 19. Purlin 2 is also mechanically directly or indirectly attached to a surface 24 of a barrier panel 20 to form a cavity 23 between the solar power generation panel 1 and the barrier panel 20. Electrical cables 7 may conveniently be disposed in cavity 23.

One or more liquid conduits 3 are affixed to a surface 26 of the barrier panel 20. The liquid conduits 3 may include perforations (not shown) or other attachments for dispersing liquid-based agricultural material conveyed through such conduits 3 in a preferred manner by the farm owner or operator. Exemplary liquid-based agricultural material includes, but is not limited to, irrigation material, such as water, pesticides, herbicides, and fertilizing material. In the alternative, the conduits 3 may include no perforations or other dispersal attachments and act to convey the liquid-based agricultural material therethrough without dispersing material. Further, due to the design of the module 22, the conduits 3 may be interchanged with those having the desired dispersal properties.

It is advantageous for the solar power generation panel 1 to have at least four edges including two edges disposed substantially parallel to one another to enable panels 1 of the system modules 22 to be arranged in rows with the substantially parallel edges locating in close proximity or touching the substantially parallel edges of adjacent system modules 22. Suitable solar power generation panels for the solar power generation panel 1 include conventional commercially available panels including, for example, panels manufactured by LONGi Solar, JinkoSolar Holding Co., Ltd, and SunPower Corporation. Moreover, it is advantageous with such panels that the purlin 2 extend in a direction from one of the substantially parallel edges to the other of the substantially parallel edges of the solar generation panel 1 for ease of routing the electric cabling 7 between adjacent modules 22. The electrical cables 7 may include, for example, one or more cables connected to the solar power generation panel 1, and other electrical cables originating for other system modules 22 disposed proximate the depicted system module 22.

It should be readily understood that barrier panel 20 may be comprised of a material or layers of materials to provide a waterproof barrier to prevent liquid-based material originating from the liquid conduit 3 from contacting the electrical cable 7 or electrical components (not shown) associated with the solar power generation panel 1 located above the barrier panel 20. An optional light emitting device 6 may be affixed to or suspended from the surface 26 of the barrier panel 20. Structural support in an exemplary form of a post 4 is attached to the system module 22 at, for example, surface 26 of the barrier panel 20, and a footing 5 securable to the ground. Also depicted in FIG. 1 is an electrical combiner 8 mounted to post 4. Such combiner 8 is further addressed with regard to FIG. 5.

Figure 2:
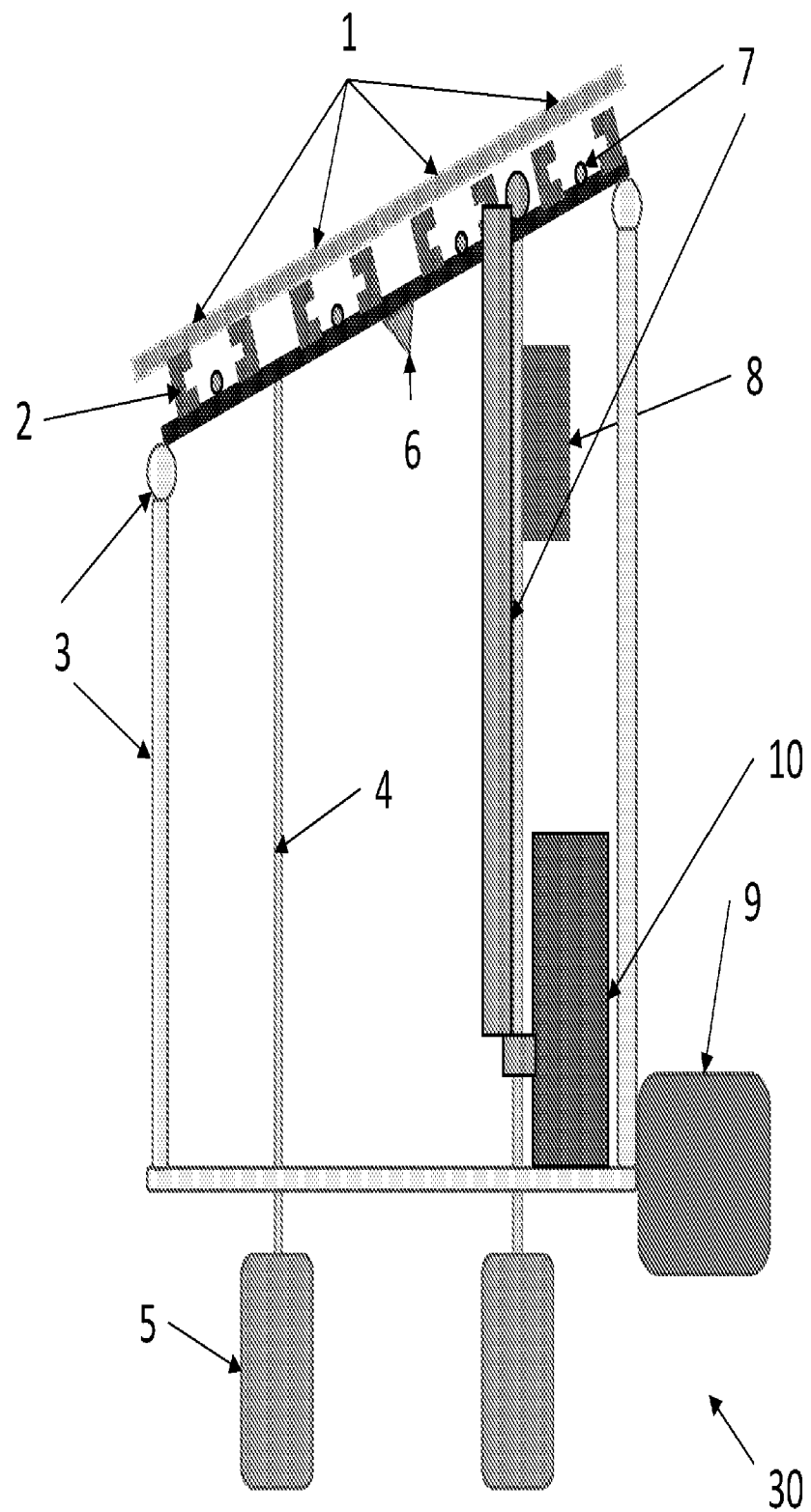
FIG. 2 depicts a view of an exemplary system suitable for use as an end system of a row of solar power generation and agricultural material dispersion systems in accordance with this disclosure.

FIG. 2 depicts another embodiment of the exemplary system 22 suitable for use as an end system 30 of a row of a plurality of solar power generation and agricultural material dispersion system modules 22. In such row of modules 22, the liquid conduits 3 of adjacent modules are connected to together and the electrical cables 7 originating or terminating at respect modules 22 extend through the cavities 23 of the intervening modules between such originating or terminating modules 22. The system 30 includes many of the components and features depicted in the system module 22 of FIG. 1. An inverter 10 is depicted attached to post 4 and is coupled to the solar power generation panel 1 of one or more modules 22 in the row via electrical cable(s) 7 for generating alternating current ("AC") for transmission of the direct current ("DC") power generated by the panel(s) 1 within such row. A liquid pump system 9 may also be coupled to liquid conduit 3 for providing the liquid-based agricultural material for dispersal by the row wherein the liquid conducts 3 of respective systems 22 are connected to respective liquid conducts 3 of adjacent systems 22 and end systems 30.

Figure 3:
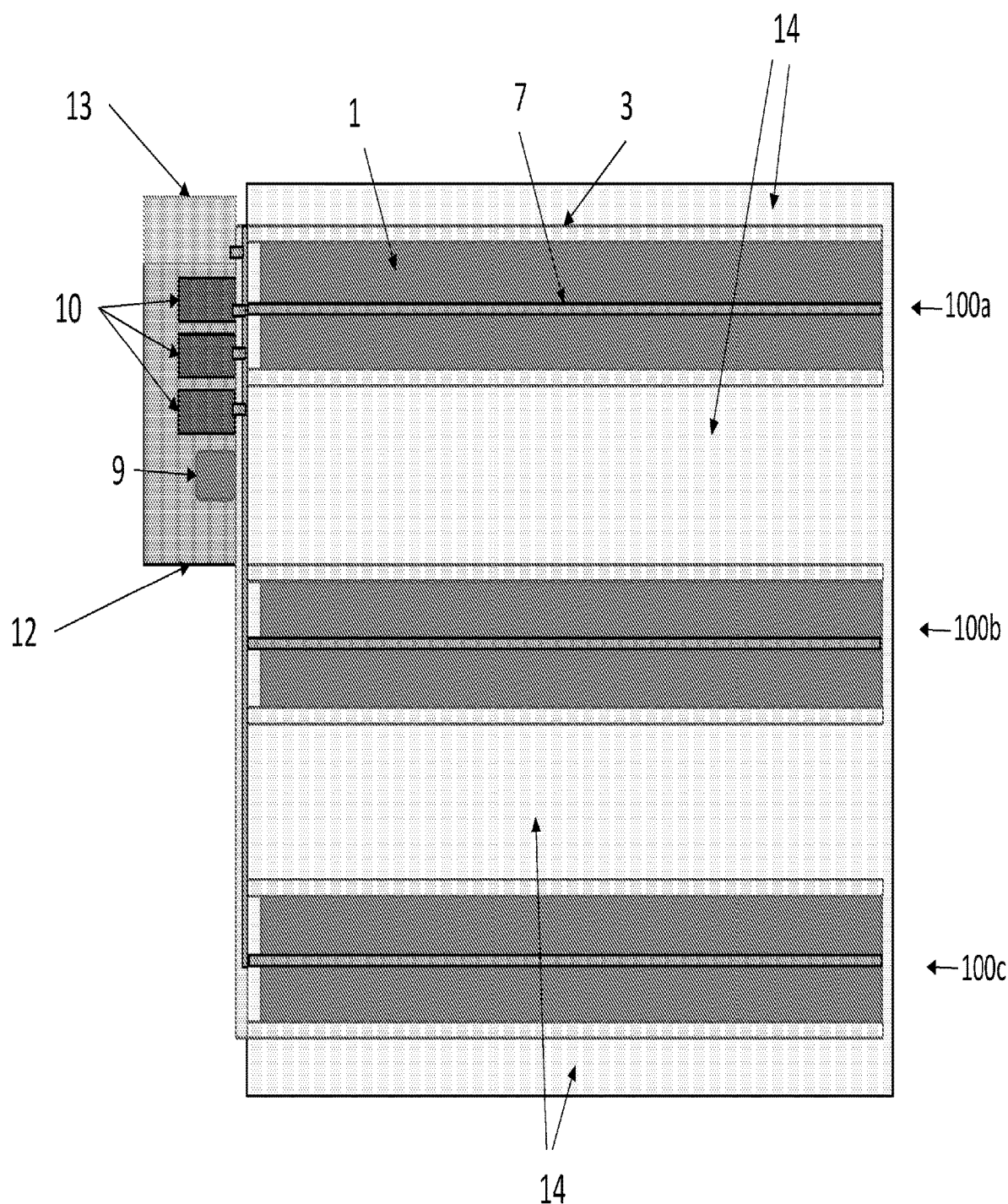
FIG. 3 depicts a top view of an exemplary configuration of multiple rows of solar power generation and agricultural material dispersion systems in accordance with this disclosure.
Figure 4:
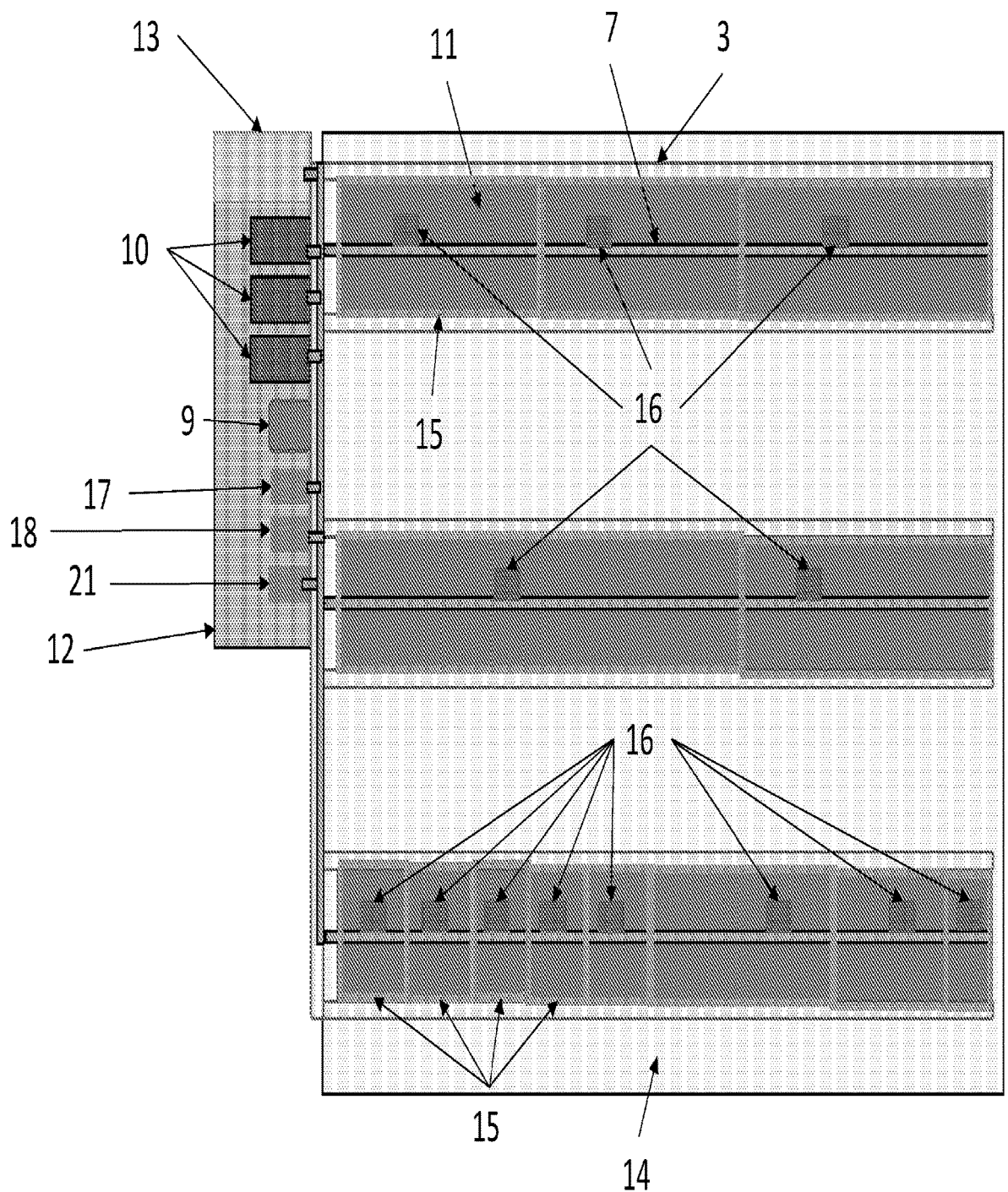
FIG. 4 depicts an exemplary alternative embodiment of the configuration of FIG. 3.

FIGS. 3 and 4 depict a top view of an exemplary configuration of multiple rows 100a, 100b and 100c of solar power generation and agricultural material dispersion system modules 22, 30. Electrical cable 7 and liquid conduit 3 are shown for clarity, although in practice much of these conduits would be underneath solar power generation panels 1 and not be visible from a top view. An exemplary liquid pump system 9 is coupled to the system of liquid conduits 3. Inverters 10a, 10b, and 10c are coupled to electrical cables 7 emanating from the system modules 22, 30 within the respective rows 100a, 100b and 100c. An utility power grid interface 13 is depicted as coupled to the inverters 10a, 10b and 10c for ease of explanation, but a transformer (discussed below with regard to FIG. 5) may be disposed between the inverters 10a, 10b and 10c, and the power grid interface 13.

The rows of system modules 22, 30 are further depicted disposed on agricultural land 14, e.g., farmland. Inverters 10, liquid pump 9, controller 17, network-accessible communication device 18, and transformer 21 may be located on optional support pad 12. In FIG. 4, power meters 16, controller 17, network-accessible communication device 18, and transformer 21 are each depicted, and further explained in greater detail with regard to FIG. 5. Power meters 16 are each configured to determine the power output of one or a group of system modules 22, 30. Support pad 12 may be constructed of, for example, concrete or other suitable materials from providing a stable base pad for such equipment.

Also in FIG. 4, groupings 15 of solar power generation panels 1 and/or system modules 22, 30 represent those panels 1 and/or modules 22, 30, that may be owned by separate legal entities including, for example, the sale of air rights by the farm owner. Ownership of such grouping may be in legal form of or analogous to, for example, condominium, coop, or other property-ownership mechanisms.

The plurality of system modules in each row 100a, 100b, and 100c, are specifically configured with a distance between adjacent rows and/or a barrier panel height relative to the ground to enable farm equipment to move unobstructed therebetween. Suitable distances between rows may be in the range of, for example, approximately 15 feet to 60 feet, and/or suitable height of the barrier panel may be in the range of, for example, approximately 8 feet to 18 feet.

Figure 5:
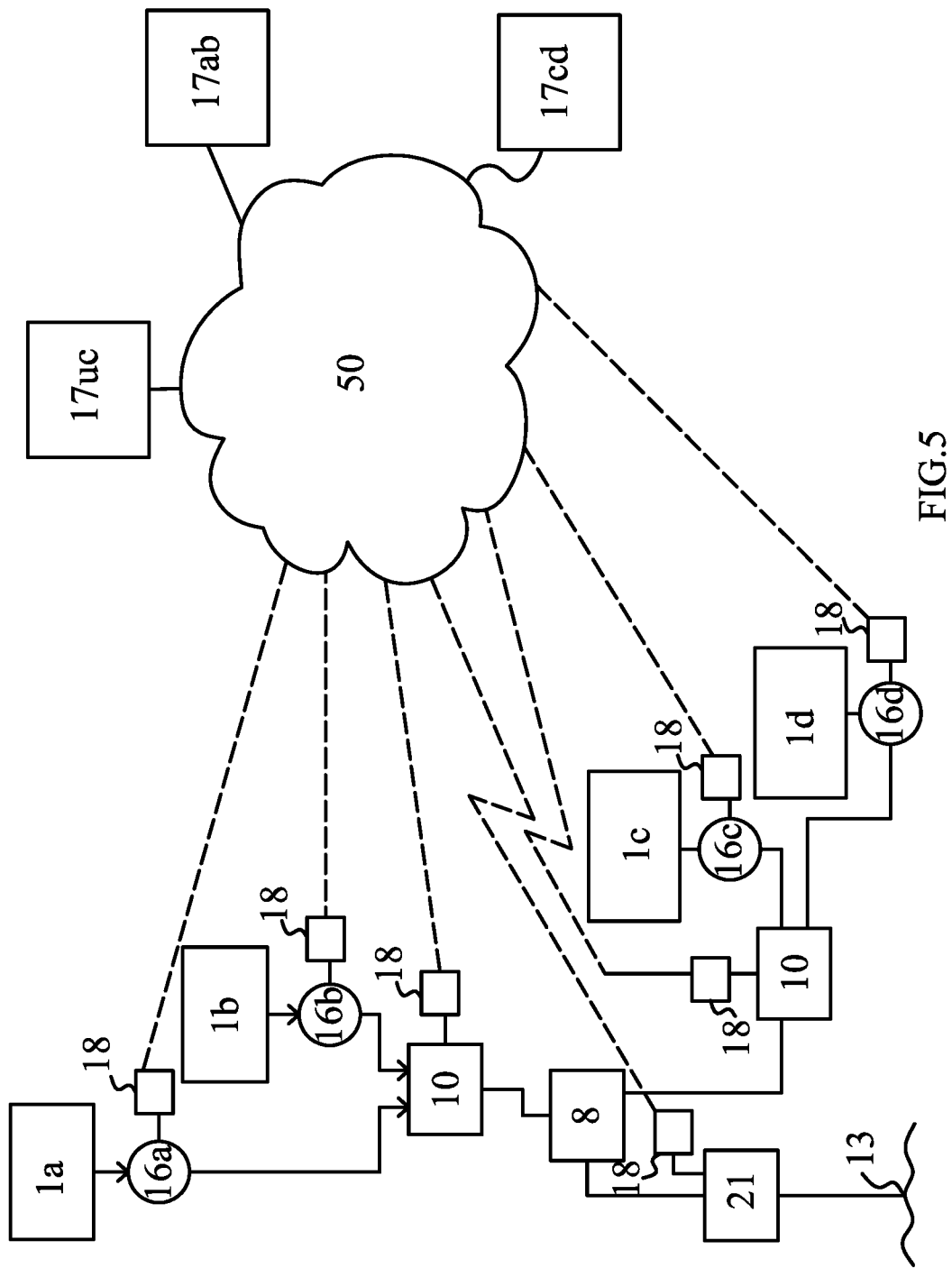
FIG. 5 depicts a schematic block diagram of exemplary components of the solar power generation and agricultural material dispersion systems in accordance with this disclosure.

In FIG. 5 a representative schematic block diagram 200 is shown of exemplary components of the solar power generation and agricultural material dispersion systems 22, 30. Solar power generation panels 1a, 1b, 1c, and 1d are electrically connected to power meters 16a, 16b, 16c and 16d respectively. Power meters 16a, 16b, 16c and 16d are electrically connected to inverters 10, which in turn is electrically connected to the electrical combiner 8. The combiner 8 is further electrically connected to the transformer 21. The transformer 21 is further electrically connected to the coupled to utility power grid interface 13. Network-accessible communication devices 18 are coupled to power meters 16a, 16b, 16c and 16d, inverters 10, and transformer 21.

The network-accessible communication devices 18 are depicted for illustration purposes, as wireless communication devices in communication with internet 50 and may, for example, be readily-available 4G LTE-compliant or 5G-compliant data communication devices, or other devices capable of transmitting to and receiving data from a network, such as internet 50. It should be readily understood that such communication devices 18 may alternatively be wired communication devices, and alternative private or public networks may be utilized instead of the internet 50 in accordance with this disclosure.

Further in FIG. 5, there is a connection with the internet 50 by a controller/monitor 17ab of a first owner who owns solar power generation panels 1a and 1b (or their corresponding system modules 22, 30), and by a controller/monitor 17cd of a second owner who owns solar power generation panels 1c and 1d (or their corresponding system modules 22, 30). Similarly, a controller/monitor 17uc of a utility provider that owns or operates the power grid associated with the interface 13 is also depicted with a connection to the internet 50.

The presently disclosed system may include, for example, a lighting system (e.g., a light emitting device) such as, for example, light emitting device 6 in FIGS. 1 and 2, under each row and metered grouping of panels 1 (or their corresponding system modules 22, 30). This lighting system provides many benefits to the overall system as a combined element. The lighting system's primary purpose is to provide security and maintenance lighting for the system modules 22, 30 and to allow maintenance to be conducted at night. Night maintenance is preferable to day maintenance so that the system can continue to remain online and operate during sunlight hours. This lighting system may also beneficial for the agricultural system because it allows for extended hours of harvest, especially during the fall seasons. Harvest is routinely delayed due to "running out of daylight" and such lighting enables the harvesting to continue. In addition, by lighting the field, the harvest time can be extended allowing farmers to better allocate the time of workers by harvesting non-lighted fields during daylight hours and lighted fields during the evening hours. Thus, this operational benefit to farmers and solar maintenance allows for better operational efficiencies for both entities.

Each row and/or metered grouping of panels 1 (or their corresponding system modules 22, 30) may additionally include video camera (not shown). Such surveillance systems allow the owner and/or utility company (or others) to monitor the solar equipment for security, operational, or marketing purposes, while also allowing the ability to monitor the agricultural production below the panels. As such, the farmer will have the ability to review the agricultural designated cameras in order to better assess their agricultural produce for planning purposes.

The systems of this disclosure may also include an air cannon system (not shown) which may be, for example, integrated with the surveillance system. Operation of traditional air cannon systems include randomly providing bursts of loud noises to scare animals away from the crop. These random bursts occur throughout the day and over time the wildlife population often becomes accustom to these bursts, diminishing the efficiency of the system. By combining the camera systems with an active air cannon system, the bursts would no longer be random, nor occur throughout the day. Instead, these bursts may, for example, be produced only when wildlife is nearby. In this manner, the system would better replicate a human reaction to wildlife and the wildlife would likely not grow accustom to the bursts, dramatically improving the overall effectiveness of the system.

The disclosed system may also include individual or groups of panels (or system modules) owned by respective entities to have a network connection via the communication devices 18 thereby connecting with the utility or electric distribution company associated with communication device 17uc (individually and collectively, the "EDC"), which allows the EDC to better allocate and deploy the system's overall electric power production. Each meter 16a, 16b, 16c and 16d may be a smart digital meter that enables communication by their associated communication devices 18 for enabling communication with the EDC and others to individually monitor the production of each metered group.

The communication devices 18 associated with the inverters 10 may likewise have an internet connection and thus be in communication with the EDC via the communication device 17uc, which would enable the EDC to better manage the overall grid for that geographic area. This feature is particularly useful in power grids with a large quantity of solar energy in a given day or hour, which may cause overproduction of electricity in times of peak sun intensity. This overproduction can result in significant damage to the power grid. By directly allowing inverter access to the EDC, the solar portion of the disclosed system can be "turned off" enabling the EDC to rapidly manage the load on the power grid.

Each inverter is a smaller portion of the grid and digitally turning off each individual inverter may not be desirable. To address the large quantity needs of the grid operator, the transformers themselves may employ communication devices 18 for connecting to the EDCs, for example by the internet, allowing large portions of the solar panels to be switched off remotely.

These internet connections also provide significant benefits to the owner of a group of panels 1 or system modules 22, 30, and others in that it provides more information for better management of the overall power generation system. The owner can address the individual efficiency of each individually metered section and each individual inverted section of the system. These results are then comparable with the remaining system to determine if a mechanical issue might be developing in one portion of the module array.

The systems of the present invention may additionally include gutters or other water collection devices to which the solar panels divert rainwater. The gutters may diverted the rainwater to agricultural matter dispersion conduits or pipes or collection receptacles.

The present disclosure relates to a solar power generation and agricultural material dispersion system having at least one system module which comprises: a solar power generation panel having a solar energy collection surface disposed opposite a base surface, and at least four edges, the at least four edges including first and second edges disposed substantially parallel to one another; a barrier panel having a first surface disposed opposite to a second surface; at least two coupling elements extending between and coupled to the base surface of the solar power generation panel and the first surface of the barrier panel, said coupling elements specifically configured to form a cavity between the solar power generation panel and the barrier panel extending in a direction between said first and second edges of the solar power generation panel to enable an at least one electrical cable to be disposed within said cavity; and at least one liquid conduit coupled to the second surface of barrier panel and extending in a direction between said first and second edges of the solar power generation panel, the at least one liquid conduit specifically adapted for conveying agricultural dispersion material, wherein said barrier panel provides a waterproof barrier between the at least one conduit and any electrical cables disposed within said cavity.

In one embodiment, the coupling elements are purlin beams, which may extend in a direction from the first edge to the second edge of the solar generation panel.

The system may further include a support structure specifically adapted for securing the system module to at least one footing. Such support structure having, for example, at least one post directing or indirectly to the at least one footing and coupled to the system module by, for example, fastening such at least one post to the second surface of the barrier panel or other components of the system module.

In further embodiment, the system comprises a plurality of system modules disposed proximate one another to form a row of system modules with the first edge of the solar generation panel of a first system module is disposed proximate the second edge of the solar generation panel of a second system module, wherein the at least one electrical cable disposed within and extends through the cavities of the first and second system modules. In yet a further embodiment, the plurality of system modules are specifically configured for arrangement into a plurality of rows in an agricultural field, and wherein the system modules within a respective row are disposed such that first edges of solar power generation panels are adjacent to the second edges of adjacent solar power generation panels.

In another embodiment, at least one other of the solar power generation panels of the plurality of system modules for use in a farmland application comprises a second group of the plurality of system modules, and wherein the first and second groups of the plurality of system modules are specifically adapted for ownership and control by different business entities. Further, it is possible in accordance with this disclosure to include a first meter electrically coupled to at least one of the solar power generation panels of the plurality of system modules that comprises the first group of the plurality of system modules for detecting a characteristic of the first group including, for example, voltage, current, power or other characteristics for the operation and maintenance of such system.

In one embodiment, the agricultural field is farmland, pastures, paddy fields, vineyards, stranded land assets, arable land, or non-arable land.

In one embodiment, the agricultural field is a field for cultivating crops. Such an embodiment specifically excludes areas for feeding, holding or otherwise caring for livestock.

In one embodiment, the agricultural material dispersal system may include a main pipe located underground with T-junctions being fastened to the structure to elevate the liquid materials to an above ground sprinkler or water head.

It is to be understood that the invention is not limited to the particular embodiments of the invention described above, as variations of the particular embodiments may be made and still fall within the scope of the appended claims.

The invention claimed is:

1. A solar power generation and agricultural material dispersion system comprising:
   at least one system module comprising:
      a solar power generation panel having a solar energy collection surface disposed opposite a base surface, and at least four edges, the at least four edges including first and second edges disposed substantially parallel to one another;
      a barrier panel having a first surface disposed opposite to a second surface;
      at least two coupling elements extending between and coupled to the base surface of the solar power generation panel and the first surface of the barrier panel to form a cavity between the coupling elements, the solar power generation panel and the barrier panel, the cavity extending in a direction between said first and second edges of the solar power generation panel;
      at least one electrical cable disposed within said cavity; and
      at least one liquid conduit coupled to the second surface of barrier panel and extending in a direction between said first and second edges of the solar power generation panel, the at least one liquid conduit specifically adapted for conveying agricultural dispersion material, wherein said barrier panel provides a waterproof barrier between the at least one conduit and the electrical cable disposed within said cavity.

2. The system of claim 1, wherein the coupling elements are purlin beams.

3. The system of claim 2, wherein the purlin beams extend in a direction from the first edge to the second edge of the solar generation panel.

4. The system of claim 1, further comprising a light emitting device disposed on a second surface of the barrier panel.

5. The system of claim 1, further comprising a support structure having at least one post coupled to the system module, the support structure specifically adapted for securing the system module to at least one footing.

6. The system of claim 5, further comprising a plurality of the system modules disposed proximate one another with the first edge of the solar generation panel of a first system module disposed proximate the second edge of the solar generation panel of a second system module, wherein the at least one electrical cable disposed within and extends through the cavities of the first and second system modules.

7. The system of claim 5, wherein the plurality of system modules are specifically configured for arrangement into a plurality of rows in an agricultural field, and wherein the system modules within a respective row are disposed such that first edges of solar power generation panels are adjacent to the second edges of adjacent solar power generation panels.

8. The system of claim 7, wherein the plurality of system modules are specifically configured with a distance between adjacent rows to enable farm equipment to move unobstructed therebetween.

9. The system of claim 7, wherein the plurality of system modules are specifically configured such that an edge of the barrier panels along the length of the row of system modules is at a height to enable farm equipment to move unobstructed between adjacent rows of the system modules.

10. The system of claim 7, wherein the plurality of system modules comprises first and second groups of system modules, and wherein the first and second groups of system modules are specifically adapted for at least one of ownership and control by different business entities.

11. The system of claim 10, further comprising a first meter electrically coupled to at least one of the solar power generation panels of the first group of the plurality of system modules for detecting a characteristic of the first group, said first meter is further electrically coupled to the at least one electrical cable.

12. The system of claim 11, further comprising at least one inverter electrically coupled to at least one of the solar power generation panels of the first group of system modules.

13. The system of claim 12, further comprising at least one of transformer electrically coupled to the at least one inverter and an interface to a utility power grid.

14. The system of claim 13, further comprising a controller and a network-accessible communication device electrically connected to at least one of the inverter, transformer and solar power generation panels of the of the first group of system modules.

15. The system of claim 14, wherein the controller is coupled to at least one of the transformer and inverter, and specifically adapted to transmit a status signal to an authorized entity indicative of an operational characteristic of the at least one of the inverter, transformer and the first group of system modules.

16. The system of claim 15, wherein the controller is further specifically adapted to transmit instruction signals to at least one of the inverter or transformer to cease transmitting electrical power to the utility power grid, upon receipt of a disconnect control signal from an authorized entity based on the status signal.

17. The system of claim 16, wherein said transformer is electrically coupled to inverters connected to the second group of system modules.

18. The system of claim 11, wherein the characteristic is the electrical power generated by the at least one of the solar power generation panels.

19. The system of claim 1, wherein the agricultural dispersion material comprises water.

20. The system of claim 1, wherein the system module further comprises a video camera for monitoring at least one of the system modules and adjacent system modules.

21. The system of claim 20, wherein the at least one of the system modules further comprises an air cannon system, said air cannon system controllable based images obtained by the video camera.

* * * * *